H. J. GOSS

May 17, 1932. ENVELOPE MACHINE Re. 18,463

Original Filed June 16, 1928 2 Sheets-Sheet 1

Inventor
Harold J. Goss
by A. W. Harrison
Attorney

H. J. GOSS

May 17, 1932. ENVELOPE MACHINE Re. 18,463

Original Filed June 16, 1928 2 Sheets-Sheet 2

Inventor
Harold J. Goss
by W. W. Harris
Attorney

Reissued May 17. 1932

Re. 18,463

UNITED STATES PATENT OFFICE

HAROLD J. GOSS, OF NASHUA, NEW HAMPSHIRE, ASSIGNOR TO THE INTERNATIONAL PAPER BOX MACHINE COMPANY, OF NASHUA, NEW HAMPSHIRE, A CORPORATION OF MAINE

ENVELOPE MACHINE

Original No. 1,765,419, dated June 24, 1930, Serial No. 286,010, filed June 16, 1928. Application for reissue filed August 22, 1931. Serial No. 558,815.

This invention relates to the manufacture of folded paper receptacles, and has particular reference to the making of such receptacles in the form of what are usually called envelopes, the specific shape made by the machine illustrated being vertically elongated and consequently similar to a paper bag having a top flap which may be folded down by hand after the receptacle has been filled. I do not limit myself however to the production of such specific shape of receptacle, as the machine may be readily adjusted to fold blanks of other kinds or shapes to produce receptacles for various purposes such as those which are employed for enclosing mail matter and other material.

Machines of this general type as heretofore constructed comprise primary and secondary folding mechanisms at an angle to each other, the first operating to feed the blanks successively in the direction of one axis of the blanks and partly folding the blanks while travelling, the second mechanism operating to feed the primary folded blanks in the direction of their transverse axes and completing the folding thereof, the said partly folded blanks being arrested momentarily in a location at the angle of and intermediate the primary and secondary folding mechanisms.

A machine of the general type referred to is illustrated in Letters Patent No. 1,253,054, issued January 8, 1918, upon an application by Labombarde and Sidebotham, and several other well-known patents.

In all machines of said general type, so far as I am aware, each blank is temporarily arrested at the end of the primary folding operation in order that it may be accurately started in a new direction into the secondary folding mechanism. Such stopping of the blanks necessarily involves some waste of time in the operation of the entire machine.

Another and an important objection to said general type of machine is that blanks of thin material, such as glassine paper, can not be accurately and uniformly folded by such machines for two reasons, one being that when the blanks contact with whatever stop devices are employed to arrest them at the angle, the thin edges of the blanks are liable to be curled up; and the other being that such thin blanks, after having been primarily folded and consequently having overlapping flap edges, are difficult to start or feed in the new direction without slipping.

The object of the present invention is to provide an improved machine for making such articles as referred to, in which machine the blanks, instead of being moved first in one direction and then in another direction, with an intermediate stop and associated feeding mechanism, travel in the same general direction and are themselves given a lateral turn between the primary and the secondary folding mechanism.

With such object in view, the invention consists in the construction and combination of parts substantially as hereinafter described and claimed.

Of the accompanying drawings.

Similar reference characters designate similar parts or features in all of the views.

Figure 1:
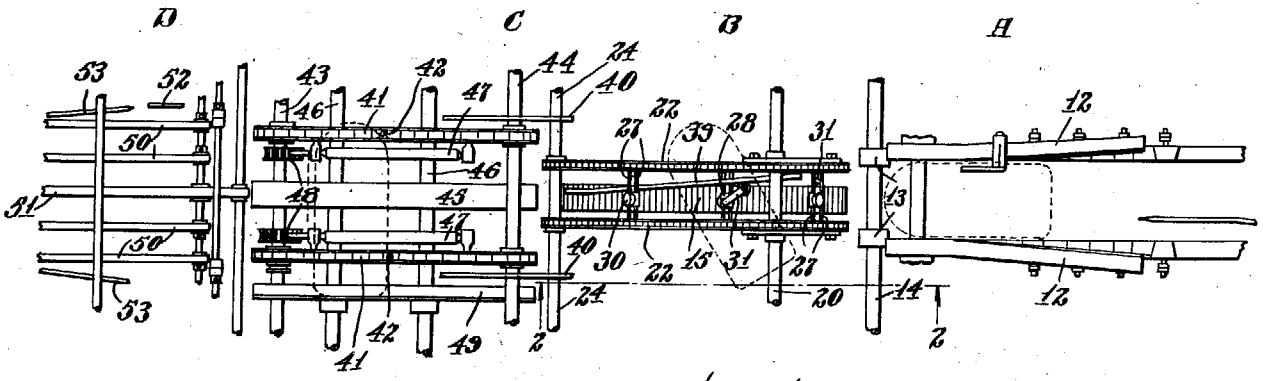
Figure 1 is a plan view, somewhat diagrammatic, of a machine having my improvements, the extreme ends of the machine which are well-known as hereinafter explained, being omitted to provide space for the parts which are included in the present invention.

Referring first to Figure 1, four parts or groups of the machine are, for convenience of description, illustrated under the letters A, B, C and D. As the frame and gearing of the complete machine may be of any well-known or preferred construction, illustration thereof is unnecessary it being sufficient to explain that the groups A and D respectively represent portions of the primary and secondary folding mechanisms which may be similar to what is explained in the patent hereinbefore referred to, while the group B represents the mechanism which gives a quarter turn to each primarily folding blank issuing from the group A, and the group C represents the mechanism which ensures squaring up or registration of each turned blank so that it will pass accurately to the group D.

The blanks from a feeding table not necessary to illustrate, are primarily folded, after having glue applied to a marginal portion of each, by mechanism such as illustrated in the patent referred to, which mechanism includes twist belts portions of which are illustrated at 12 in Figure 1; and said primarily folded blanks are transferred by nipper rolls 13 carried by shafts 14 (see also Figure 2) to the mechanism which imparts a quarter turn to each blank and which mechanism forms the principal subject matter of the present invention and will now be described. It is to be understood that the primarily folded blanks issue from the group A singly and in such timed and spaced relationship as to be correctly operated upon by the travelling turntable mechanism of group B.

Each primarily folded blank is delivered onto a travelling platform 15 (Figs. 1 and 2) which, preferably, consists of what is known as a silent chain belt. Said belt is mounted on wide sprockets 16 and is driven by another wide sprocket 17 carried by a shaft 18. The upper stretch or run of said belt platform travels over a fixed plate 19 so that said stretch can not be flexed or depressed by pressure thereon.

Mounted on tie rods 20, 21, of the machine are brackets and bearings for the shafts of sprockets for two chains 22. The sprockets 23 are carried by shaft 24 which is driven by any preferred gearing, and said chains pass over upper sprocket 25 carried by adjustable arms 26 (Fig. 2).

Figure 4:
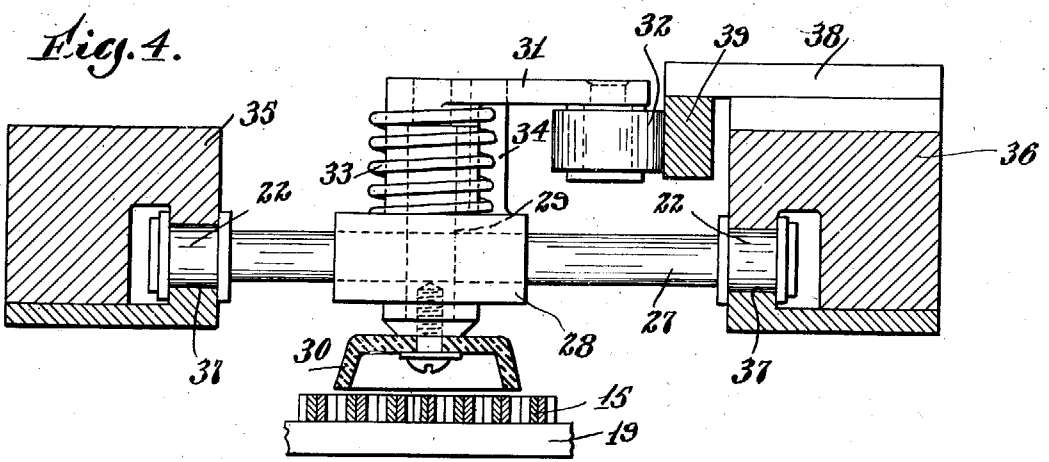
Figure 4 is a view looking in the direction of the arrow 4 adjacent to Figure 3.

At certain intervals the links of the two chains 22 are connected by a pair of transverse rods 27. Mounted on each pair of rods 27 is a fixed block 28 (Figs. 2 and 4) in which is mounted a vertical spindle 29 to one end of which is secured a friction member 30 preferably of cup-shaped rubber. The other end of the spindle has an arm 31 carrying a roll 32, a spring 33 being employed to tend to hold the arm 31 against a stop 34 rising from the block 28.

Figure 3:
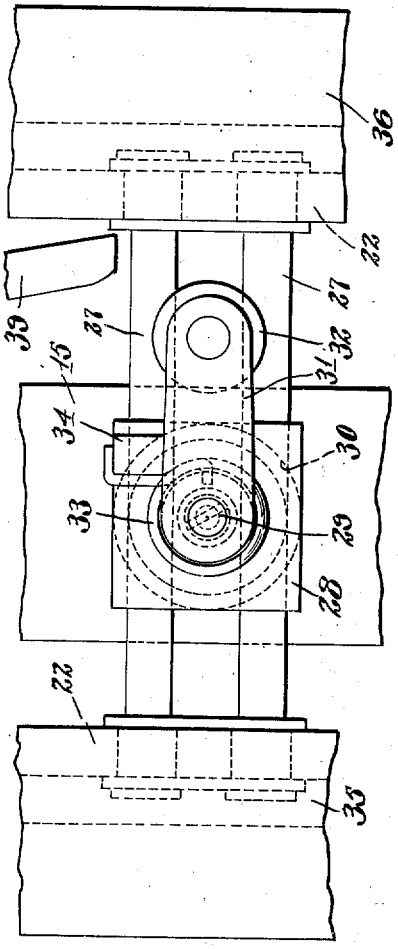
Figure 3 is a detail plan view, on a scale larger than Figure 2, of one of the blank-turning devices and its carrying members.
Figure 2:
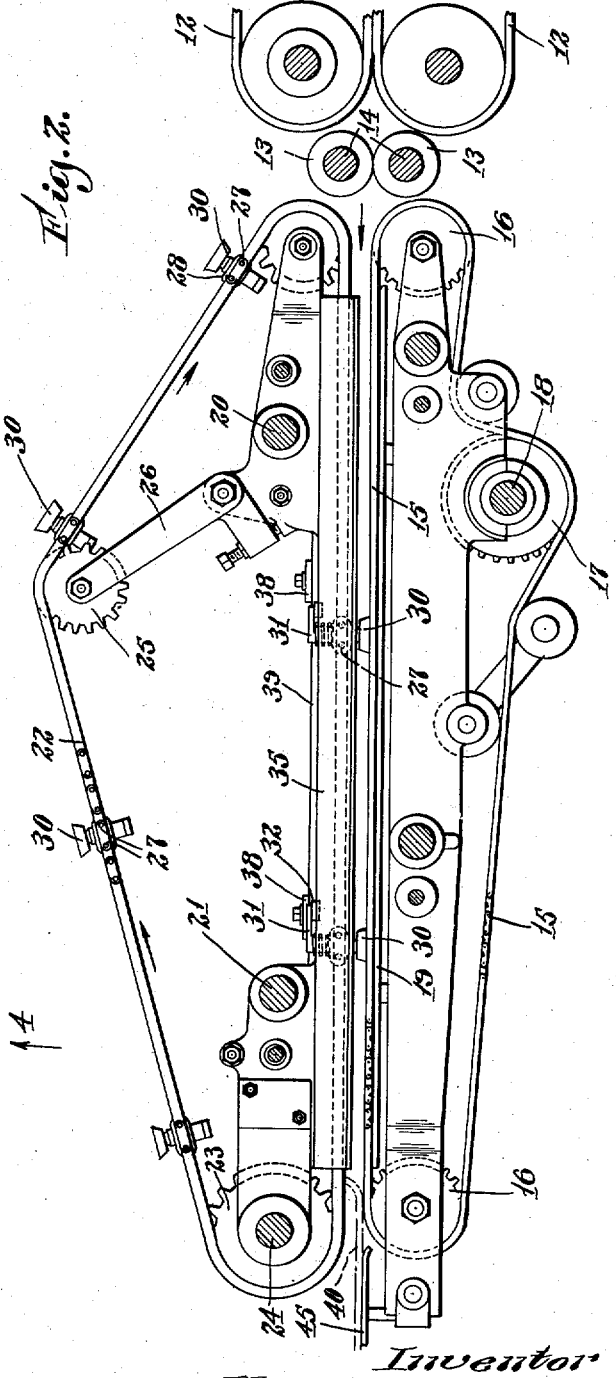
Figure 2 is an elevation, partly in section on line 2—2 of Figure 1, on a larger scale.

Supported by the tie rods 20, 21, through the medium of the brackets that are mounted thereon, are two straight bars 35, 36, (Figs. 2, 3 and 4) each having a guide-way or track 37 in which the links of the chains 22 travel when the machine is in operation, said tracks being parallel with the plate 19 which guides the travelling platform, so that the friction members 30, when travelling as presently described, will hold the blanks under continuously uniform pressure from one end to the other of the mechanism illustrated in Figure 2 and in the group B of Figure 1.

To cause the friction pressers to turn, while travelling, and in opposition to the action of the springs 33, the bar 36 has mounted thereon two or more arms 38 (Figs. 2 and 4) which fixedly support a strip 39 that is so inclined laterally (Fig. 1) that as each roll 32 rides along its face, the spindle 29 and the presser 30 carried thereby is turned one quarter of a rotation. Therefore any preliminarily folded blank that is on the chain platform 15 under a presser 30 is turned in its entirety by said presser. That is, no portion of it is arrested; it is bodily turned. Of course the distance between the horizontally guided platform 15 and the horizontally guided spindles which carry the friction pressers is such that each presser, when first carried down to contact with a blank on the platform is marginally flexed so as to obtain a rather wide-spread uniform frictional grip on the blank to turn it bodily as described while travelling toward the mechanism illustrated by the group C of Figure 1, in which figure the group C is indicated with a slight space between it and the group B because said Figure 1 is practically a diagram. In practice, the chains 41 of group C presently described extend sufficiently past the delivery end of the group B to enable each laterally turned blank that is so delivered, to be landed on said chains 41 just beyond pins 42 carried by said chains.

When the turned blanks pass from group B to group C, the portions of the blanks which extend laterally from the sides of the platform 15 pass under the curved ends of a pair of stationary guides 40 so that when the cup-shaped pressers 30 pass up over the shaft 24 (Fig. 2) the blanks will not be lifted up by suction but will be left free to be taken by the chains 41 and their pins 42 of the mechanism of group C, said chains being mounted on sprockets carried by shafts 43, 44.

Between the chains 41 and parallel therewith is a guide or platform strip 45 mounted on tie rods 46 of the machine frame. Suitably mounted on both sides of said strip and parallel therewith are long friction rolls 47, preferably rubber surfaced, and having worm-gearing connections 48 with the shaft 43, said gearing serving to rotate both of the friction rolls 47 slowly in a direction to cause slight lateral movement of any blank that is not squarely borne by the chains, such movement being toward a straight edge guide 49 which is adjustably mounted on the tie rods 46.

The friction rolls 47 are so mounted that their uppermost portions are in the plane of, or very slightly above the plane of, the chains 41, their object or purpose being to frictionally urge or hold each blank laterally against the edge guide 49 to ensure correct lateral position of each blank forwarded by the chains to the secondary folding mechanism of group D. Sometimes one of the two long friction rolls 47 may be omitted.

From the squaring up or laterally registering mechanism just described, the blanks pass, without stopping, to the secondary folding mechanism, but in partially turned positions so that the second folds will be at a right angle to the first-made folds. Since the secondary folding mechanism is or may be the same as that of the patent hereinbefore referred to, it is sufficient for present purposes to state that it includes belts 50, 51, which carry the turned blanks past a glue disk indicated at 52 and then past inclined rods 53 (one of which is sometimes omitted) by means of which end flap portions are first turned up, said end flaps being then completely folded by twist belts as explained in the patent hereinbefore referred to.

In practice the timing of operation of the entire machine is such that each primarily folded blank is delivered onto the travelling platform 15 in such position thereon that a presser 30, moving down past the upper rolls 13 (Fig. 2) will bear on such blank at substantially the middle thereof. Then, as the roll 32 of that presser spindle rides along the cam strip 39, the presser will turn and carry or twist the blank around on the platform the surface of which is of a character to avoid frictional resistance to such turning. When such cup and blank reach the end of the cam strip, the blank has been given a quarter turn and is delivered under the guides 40 and to the mechanism of group C which so squares up or registers the turned blank against the side edge guide 49 that the blank is accurately delivered by the pin chains 41 for the completion of the folding by the secondary folding mechanism.

From the above it will be understood that the chain platform 15 and each moving presser 30 constitutes a travelling turn table mechanism which transports a blank from a primary to a secondary folding mechanism without requiring any stoppage at an intermediate point or any feeding mechanism to start the blank in a second direction of travel.

In this connection it is to be understood that I do not limit myself to any squaring up mechanism such as illustrated in group C because such mechanism may be dispensed with in machines for folding blanks that do not need to be squared up.

Among the advantages of my invention I may point out that my turning mechanism engages a face of a blank and not an edge and consequently I avoid any curling or other displacement of such edge; and that the bodily movement of the blank in turning and especially such bodily movement without substantial lateral movement of the centre of gravity of the blank provides a shorter and quicker travel of the blank.

What I claim is:

1. A blank folding machine having primary and secondary folding mechanisms, and a travelling turn-table mechanism for transporting the blanks from one folding mechanism to the other and turning them while travelling.

2. A blank folding machine having primary and secondary folding mechanisms in alinement, a carrier for supporting the blanks between said primary and secondary folding mechanisms, and an intermediate travelling mechanism for imparting a partial turning movement to the blanks.

3. A machine for folding blanks while travelling, said machine having a primary folding mechanism, a travelling turn-table mechanism, means for registering the blanks delivered from said turn-table mechanism, and secondary folding mechanism in position to act on blanks delivered to it by the registering means.

4. A blank folding machine having means for causing blanks to travel in a substantially direct path of movement from one end of the machine to the other, said machine including means for first partially folding the blanks, means for conveying the blanks beyond the aforesaid first folding means, travelling mechanism for then turning them, and means for then completing the folding.

5. Mechanism for imparting turns to blanks, comprising a moving platform and a series of pressers mounted to bear on and travel with blanks supported by said platform, means being provided for partly turning said pressers in a plane parallel with said platform.

6. Mechanism for imparting turns to blanks, comprising an endless travelling platform and an endless series of pressers mounted to bear on and travel with blanks supported by said platform, means being provided for partly turning said pressers in a plane parallel with said platform.

7. Mechanism for turning blanks while travelling, comprising an endless travelling platform, a pair of endless chains above said platform and carrying friction pressers, means for guiding said chains in a path a portion of which is parallel with said platform, and means for causing said friction pressers to turn laterally while moving with the platform.

8. Mechanism for turning blanks while travelling, comprising an endless travelling platform, a pair of endless chains above said platform, transverse rods connecting said chains, spindles supported by said rods, each spindle having a friction member at one end and a lateral arm at the other end, means for guiding said chains and their friction members in a path a portion of which is parallel with the travelling platform, and a laterally inclined cam strip over which the arms of the spindles pass to turn said spindles on their axes.

9. Mechanism for turning blanks while travelling, comprising an endless travelling platform and an endless travelling carrier a portion of which is parallel with and adjacent to the upper run of said platform, said carrier having a series of friction members, means being provided to turn said members sideways while moving along with the platform.

10. Mechanism for turning blanks comprising a rotary member movable to turn the entire blank bodily, and without substantial lateral movement of the center of gravity of the blank, by frictional engagement with the latter; and means to support the blank in position for such turning action by said member.

11. Mechanism for feeding and turning blanks comprising means to feed a blank; rotary means to turn the fed blank with the centre of gravity of the blank remaining substantially in the line of direction of said feed; and means to feed the turned blank in said direction.

12. Mechanism for rotating blanks comprising rotary means to frictionally engage a face of a blank to partially rotate the latter about a center within the area of the blank; and means to stop positively the rotation of the blank when the latter has reached the desired rotative position.

13. Mechanism for rotating blanks comprising rotary means for partially rotating a blank about a center within the area of the blank; and means to stop positively the rotation of the blank when the latter has reached the desired rotative position.

14. Mechanism for rotating blanks comprising rotary means to engage a face of a blank to partially rotate the latter about a center within the area of the blank; and means to stop positively the rotation of the blank when the latter has reached the desired rotative position.

15. A machine for acting on blanks, each blank having two flaps, said flaps extending at a right angle to each other comprising means to feed the blank, means to fold one of said flaps parallel to the direction of said feed; means to engage a face of a blank to rotate the blank so folded; means to move the blank away from the rotating means after the rotation; and means to fold the other of said flaps parallel to the direction of said moving away.

16. A machine of the character described comprising means to fold a marginal portion of each blank; means to rotate a blank about a center within the area of the blank and to advance said center during said rotation; and means to feed the folded blanks one by one to said rotating means.

17. A machine of the character described comprising means to fold a marginal portion of each blank; means to rotate a blank about a center within the area of the blank; means to advance said center linearly during said rotation; and means to feed the folded blanks one by one to said rotating means.

18. A machine of the character described comprising means to fold a marginal portion of each blank; means to rotate a blank and at the same time move it forward; means to advance the blank after its disengagement from said rotating means; means to actuate said advancing means at substantially the same speed as the speed of forward movement of the rotating means; and means to feed the folded blanks one by one to said rotating means.

19. A machine of the character described comprising means to fold a marginal portion of each blank; means to rotate a blank about a center within the area of the blank and at the same time move it forward; means to advance the blank after its disengagement from said rotating means; and means to actuate said advancing means at substantially the same speed as the speed of forward movement of the rotating means, all of said means being timed with relation to each other.

20. A machine of the character described comprising means to fold a marginal portion of each blank; means which rotate a blank about a center within the area of the blank, which center is forwardly movable during such rotation and which means feed the blank forwardly after such rotation; and means to feed the blanks one by one to said rotating means.

21. A machine of the character described comprising means to fold a marginal portion of each blank; means which engage the face of a blank and rotate it about a center within the area of the blank, which center is forwardly movable during such rotation and which means feed the blank forwardly after such rotation; and means to feed the blanks one by one to said rotating means.

22. A machine of the character described comprising means to engage a face of each blank to rotate the latter in a substantially horizontal plane about a center within the area of the blank; and means to feed the blanks, each having a folded marginal portion, one by one to said rotating means.

23. A machine of the character described comprising means to frictionally engage a face of each blank to rotate the latter in a substantially horizontal plane about a center within the area of the blank; and means to feed the blanks, each having a folded marginal portion, one by one to said rotating means.

24. A machine of the character described comprising means to engage a face of each blank to rotate the latter in a substantially horizontal plane about a center within the area of the blank; means to support the blank in position for such rotating action by said means; and means to feed the blanks, each having a folded marginal portion, one by one to said rotating means.

25. A machine of the character described comprising means movable in frictional engagement with a face of each blank to rotate the latter in a substantially horizontal plane about a center within the area of the blank; means to support the blank in position for such rotating action by said means; and means to feed the blanks, each having a folded marginal portion, one by one to said rotating means.

26. A machine of the character described comprising two cooperating elements, one of which is movable in frictional contact with a face of each blank to rotate the latter in a substantially horizontal plane about a center within the area of the blank and the other of which is movable to support the blank during such turning; and means to feed the blanks, each having a folded marginal portion, one by one to said cooperating elements.

27. A machine of the character described comprising a member movable in engagement with the face of a blank to rotate the entire blank bodily in a substantially horizontal plane about a center within the area of the blank by frictional engagement with the latter; means to support the blank in position for such rotating action by said member; and means to feed the blanks, each having a folded marginal portion, one by one to said member.

28. A machine of the character described comprising means movable in engagement with the face of a blank to rotate the blank in a substantially horizontal plane about a center within the area of the blank; and means to feed the blanks, each having a folded marginal portion, one by one to said rotating means.

29. A machine of the character described comprising means movable in engagement with the face of a blank to rotate the blank in a substantially horizontal plane about a center within the area of the blank; means to adjust said center within said area; and means to feed the blanks, each having a folded marginal portion, one by one to said rotating means.

30. A machine of the character described comprising means to engage a portion of a face of a blank to rotate the latter in a substantially horizontal plane, said engaged portion of the blank remaining in engagement with said means throughout said rotation; and means to feed the blanks, each having a folded marginal portion, one by one to said rotating means.

31. A machine of the character described comprising means to frictionally engage a face of a blank to rotate the latter in a substantially horizontal plane; means to adjust said means so as to cause engagement at any desired portion of said face; and means to feed the blanks, each having a folded marginal portion, one by one to said rotating means.

32. A machine of the character described comprising means to engage a face of each blank to rotate the latter in a substantially horizontal plane about a center within the area of the blank; means to feed the blanks, each having a folded marginal portion, one by one to said rotating means; and means to feed each blank after said rotation, all of said means being timed with relation to each other.

33. A machine of the character described comprising means to engage a face of each blank to rotate the latter in a substantially horizontal plane about a center within the area of the blank; and means to feed the blanks, each having opposite marginal portions folded, one by one to said rotating means.

34. A machine of the character described comprising means to engage frictionally a face of each blank to rotate the latter in a substantially horizontal plane about a center within the area of the blank; and means to feed the blanks, each having opposite marginal portions folded, one by one to said rotating means.

HAROLD J. GOSS.